Jan. 27, 1959  H. F. MINTER ET AL  2,871,420
POLYESTER ELASTOMERIC MOLDING COMPOSITION AND
PRODUCT PRODUCED THEREWITH
Filed Dec. 21, 1953
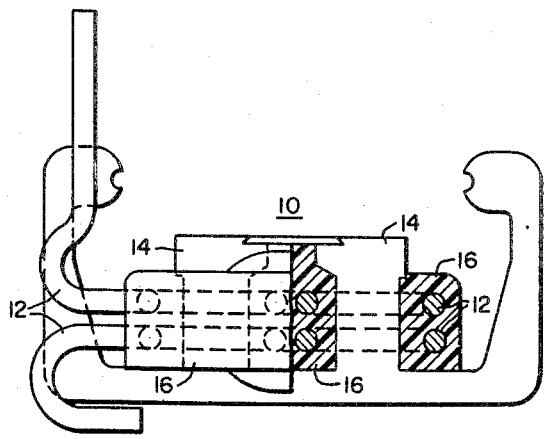
WITNESSES:
INVENTORS
Herbert F. Minter &
Newton C. Foster.
BY
ATTORNEY United States Patent Office 2,871,420
Patented Jan. 27, 1959

2,871,420

POLYESTER ELASTOMERIC MOLDING COMPOSITION AND PRODUCT PRODUCED THEREWITH

Herbert F. Minter and Newton C. Foster, Pittsburgh, Pa., assignors to Westinghouse Electric Corporation, East Pittsburgh, Pa., a corporation of Pennsylvania Application December 21, 1953, Serial No. 399,576

10 Claims. (Cl. 317—158)

This invention relates to moldable polyester resin compositions which thermoset to tough and elastomeric solids.

It has been desirable particularly in the electrical industry to have available resinous molding compositions which will thermoset into solids that are elastic even at temperatures of −50° C. or lower. Furthermore such molding compositions should possess good electrical insulating properties. In addition the thermoset moldings with large metal inserts should be able to withstand cycling over extreme variations in temperature for long periods of time without cracking or separating from the insert or otherwise failing. The compositions should be sufficiently elastic throughout an extreme range of temperatures of from above 110° C. to below −50° C. to withstand shocks and abuse without cracking, chipping or otherwise failing.

In addition, the composition should be sufficiently stable prior to being subjected to molding temperatures and pressures to have a long storage or shelf life, being characterized by little or no change in viscosity or other physical properties until being subjected to molding under heat and pressure. However when subjected to molding temperatures the compositions should cure to a tough, thermoset, elastomeric solid in a matter of a few minutes at temperatures of the order of 100° C. to 125° C., and for correspondingly shorter times at higher temperatures. It will be appreciated that it is highly desirable the molding compositions should cure without the evolution of moisture, gases or the like, which would otherwise tend to produce porous, cracked and unsatisfactory molded members.

The object of this invention is to provide a moldable polyester resin composition which thermosets to a tough and elastic solid suitable for use at temperatures ranging from −50° C. to 125° C. and higher.

A further object of the invention is to provide for electrical members comprising an electrical conductor and molded tough and elastomeric insulation applied thereto, the insulation characterized by high electrical insulating properties and being tough and elastic over a wide range of temperatures.

Other objects of the invention will in part be obvious and will in part appear hereinafter.

For a more complete understanding of the present invention reference is made to the following description taken in conjunction with the accompanying drawing, the single figure of which is a front view, partly in cross section, illustrating a current coil insulated with the polyester elastomeric molding composition of this invention.

We have discovered a novel moldable polyester composition which can be molded in a few minutes at a temperature of 100° to 125° C. into a tough and elastic thermoset solid which is suitable for use over a range of temperatures of from −50° to 120° C. Briefly the moldable composition comprises: (A) 65 to 25 parts by weight of a finely divided solid filler of which at least 70% by weight comprises inorganics of an average particle size of below 5 microns and (B) from 35 to 75 parts by weight of a polyester resin prepared as will be described immediately hereafter and (C) from ½% to 5%, based on the weight of polyester resin, of a polymerization catalyst.

The polyester resin is prepared by heating to a temperature above 150° C., but not exceeding about 260° C., the following reactants: (a) 1 mol of at least one unsaturated acidic compound, selected from the group consisting of fumaric acid, maleic acid, maleic anhydride, citraconic anhydride, and citraconic acid, (b) from 10 to 15 mols of adipic acid, (c) from 0.5 to 5 mols of propylene glycol, (d) from 14 to 9 mols of ethylene glycol, (e) from 0.1 to 0.75 mol of glycerol. The glycols and glycerol should be proportioned to provide sufficient hydroxyl groups to exceed by at least 5% but not over 15% of the number of carboxyl groups in the combined adipic acid and the unsaturated acidic compound. An acid anhydride, such as maleic anhydride is considered to be equivalent to two carboxyl groups. This mixture is heated and stirred in the presence of a suitable non-oxidizing atmosphere until a polyester resin having an acid number of below 20 and preferably below 12 is produced. When the reaction is completed the viscosity of the polyester resin in a 50% solution in toluene will be about K or higher on the Gardner-Holdt scale or 275 centipoises and higher. The polyester resin will be of the consistency of a thick syrup in the absence of the solvent.

For the purpose of the present invention up to 10 mol percent of the adipic acid may be replaced with an equimolar proportion of another saturated aliphatic dicarboxylic acid such for example succinic acid, diglycolic acid, azelaic acid, or sebacic acid. The glycerol is a critical ingredient and cannot be eliminated or the quantity depart from the proportions given without producing resinous products that have inferior physical characteristics. The polyester resin can be prepared by substituting up to 20 mol percent of the ethylene glycol and the propylene glycol with higher glycols. To this extent, diethylene glycol, 1,3-butylene glycol or triethylene glycol can be substituted for an equimolar proportion of either the ethylene glycol or the propylene glycol, or both.

The polyester resin by itself does not produce particularly satisfactory moldable products if admixed with a proportion of polymerization catalyst and cured under heat to a thermoset solid. The best molded products can only be secured when 65 to 25 parts by weight of finely divided fillers are thoroughly admixed with from 35 to 75 parts by weight of the polyester. We have discovered it can be critical to admix the polyester resin with at least 20% of its weight of a finely divided solid filler of an average particle size of below 5 microns in order to produce the superior molded members desired. Particularly good moldings are obtained when the average size of at least 40% of the particles of inorganic solid filler is below 2 microns. Excellent results have been obtained when the solid filler comprises a substantial proportion of particles of a size of less than 1 micron. Examples of suitable fillers are calcium silicate, calcium carbonate, aluminum silicate, magnesium silicate, talc, iron oxide, diatomaceous earth, hydrated alumina, silica, hydrated silicas such as mica, kaolin, bentonite and glass. The particles may have been coated with a small amount of resin such as melamine resin, a soap such as an aluminum or magnesium stearate, or coated with a drying oil such as tall oil, or a fatty acid such as stearic acid.

Additional reinforcing fibrous materials may be included in the composition to replace up to 30% of the weight of the solid fillers. Suitable fibrous fillers are asbestos, cotton, nylon, acrylonitrile resin fibers and glass fibers. The fibers may be chopped or finely divided depending on the size and shape of the moldings that are to be produced. Large moldings of several inches in size will permit the incorporation of fibrous reinforcing materials having lengths of up to an inch while smaller moldable members will permit the use of fibers of lengths of ¼ to ½ inch in the composition.

The solid filler should be intimately admixed with the polyester resin. We have secured good results by employing a two roll mill, a Banbury mixer, or a pug mill. Inasmuch as a relatively large amount of filler is incorporated the resulting molding compositions are usually of a high viscosity and they will vary from the consistency of a paste to a heavy putty.

Suitable polymerization catalysts to be incorporated in the composition are the organic peroxides and hydroperoxides used to effect vinyl type polymerization. Compounds capable of furnishing free radicals which accelerate addition polymerization may be included with the peroxide catalysts. Examples of such catalysts are benzoyl peroxide, tertiary butyl hydroperoxide, ditertertiary butyl peroxide t-butyl perbenzoate and di-t-butyl diperphthalate and of the latter free radical compounds: azomethines and azo-diisobutyronitrile. The catalysts may be incorporated into the compositions several days previous to their being molded without any adverse results. We have stored compositions containing 1½% of benzoyl peroxide for 12 days at 100° F. and as long as four months at ambient summer temperatures, without loss of any desirable molding property.

The following examples are illustrative of the invention:

EXAMPLE I

Into a reaction vessel equipped with a stirrer, gas sparging means and an air condenser were charged the following:

| | Mols |
|---|---|
| Adipic acid | 12 |
| Fumaric acid | 1 |
| Propylene glycol | 2.3 |
| Ethylene glycol | 12 |
| Glycerol | 0.3 |

The stirrer was put into operation and carbon dioxide gas was admitted to sparge the vessel. The reaction vessel was heated gradually to a temperature of 160° to 180° C., the condenser being operated for the first several hours in order to return any glycol that was entrained with escaping water. Thereafter the condenser was disconnected and the heat was applied to increase the temperature to 225° C. for twelve to sixteen hours. The viscosity of the polyester increased gradually and reached a viscosity of K on the Gardner-Holdt scale for 50% toluene solution at 25° C. The acid number of the resin was 5 at this time.

Other polyester resins were prepared following the procedure of this Example I with slight changes in the reactants. Thus the glycol mixture was varied to comprise as little as 0.5 mol up to 5 mols of propylene glycol, the ethylene glycol being correspondingly changed to keep the total moles of glycol constant. Particularly good results were secured when the glycerol was maintained in the range of from 0.25 to 0.35 mol.

The maximum temperature of esterification should not exceed 260° C. In practice we prefer to maintain the maximum temperature at about 225° C.

Esterification catalysts such as mineral acids or acid salts or para-toluene suphonic acid have been employed though they are not critical. In some instances we have applied a vacuum during the latter stages of esterification in order to remove water and unreacted components. Ordinarily, however, the sparging adequately removes the water evolved in the esterification. An azeotropic reaction procedure using 5% by weight of xylene has given good results, following the procedure of Patent 2,308,498.

The resulting polyester resin of Example I is a thick straw-colored syrup which when permitted to remain at room temperature over a long period of time or when chilled converts to a tacky semi-crystalline mass. It is characterized by having an average of about one unsaturated >c=c< group per 164 interlinked carbon and oxygen atoms in the ester chains. The glycerol provides for an occasional cross linking of a few of the ester chains without producing a solid product.

A molding composition was prepared in accordance with the following example:

EXAMPLE II

There is admixed on a cold two roll mill 60 parts by weight of the resin of Example I with 40 parts by weight of a mixture of finely divided solids. The mixture of finely divided solids comprise 80% by weight of calcium silicate of an average particle size of 0.05 micron and 20% of calcium carbonate of an average particle size of 1.5 microns. After milling for about 15 minutes there is then added to the milled composition 1.8 parts by weight of a dispersion comprising 50% by weight of benzoyl peroxide in tricresyl phosphate. After a few more minutes milling there results a stiff paste-like moldable composition.

The composition of Example II may be molded in injection, compression, transfer and extrusion molding machines. A molding cycle of 3 minutes at a temperature of 110° C. to 125° C. produces fully cured members. The molded pieces are tough and flexible and have good tear resistance.

A heavy copper coil surrounding sharp cornered magnetic pole pieces was molded within the composition of Example II to produce a solid molded member embedding the body of the coil and the pole pieces. The copper conductor was of 3/16 inch diameter and projected from the sides of the molding. The molded unit forms a meter current coil. The resulting molding was aged in an oven at 150° C. for 75 days, the heating being interrupted every three days for a few hours during which the molded member was placed in a freezer to bring it down to a temperature of below −40° C. No signs of cracking or other degradation was visible at the end of this 75 day period of tests. The member was then heated in the oven to 175° C. for 40 more days and checked every two or three days for its physical and electrical properties. At the end of this time the member had shown only a slight darkening in its color but was otherwise fully satisfactory. It was highly flexible and could be cooled to −40° C. and lower without forming or showing cracks. It was quite flexible even when so cooled.

EXAMPLE III

A molding composition was prepared from 55 parts by weight from the resin of Example I and 45 parts by weight of finely divided aluminum silicate of an average particle size of 0.5 micron and 0.85 part by weight of benzoyl peroxide, all being combined on a two roll mill in accordance with the procedure set forth in Example II. This composition could be readily molded in three minutes at 120° C. to a thermoset solid. Heavy copper coils and pole pieces such as in Example II were embedded in moldings of this composition. The resulting moldings were flexible and withstood heating for 27 days at 175° C., then 48 days at 150° C. and finally 70 days at 135° C. Every third day the coils were removed from the ovens and cooled below −40° C. In every instance the molded members were flexible and had not cracked or shown any other deterioration. Electrical tests of the moldings of Examples II and III gave dielectric strengths of well over 400 volts per mil.

A number of moldings were prepared from a composition produced by combining 50 parts by weight of the resin, .75 part by weight of benzoyl peroxide and 50 parts by weight of each of the following mixtures of solid fillers of the average particle size as indicated in Table I. The compositions were milled in accordance with the procedure set forth in Example II. The resulting compositions were then molded for three minutes at 125° C. and the resulting moldings were tested for 60 cycle straight rise dielectric strengths with results as indicated:

Table I

| Filler Composition | Dielectric Strength |
| --- | --- |
| 50% Calcium Silicate (0.05 micron)+50% Melamine Resin Coated Calcium Carbonate (1.5 microns) | 525 |
| 50% Calcium Silicate (0.05 micron)+50% Calcium Carbonate (1.5 microns) | 545 |
| 50% Calcium Silicate (0.05 micron)+50% Talc (2.0 microns) | 570 |
| 50% Calcium Silicate (0.05 micron)+50% Calcium Carbonate Fatty Acid Coated (1.0 micron) | 556 |
| 50% Magnesium Silicate (1. micron)+50% Melamine Resin Coated Calcium Carbonate (1.5 microns) | 667 |
| 80% Magnesium Silicate (1 micron)+20% Melamine Resin Coated Calcium Carbonate (1.5 microns) | 547 |

EXAMPLE IV

Fifty five parts by weight of the resin of Example I was combined with 45 parts by weight of aluminum silicate of an average particle size of 4.8 microns and 3 parts by weight of acrylonitrile resin fibers of average length of ¼ inch and 0.85 part of benzoyl peroxide. The composition was combined in a Banbury mixed in accordance with the general procedure of Example II. The resulting pasty composition was molded about a heavy copper coil. The coil was then subjected to electrical tests and found to withstand 62 kilovolts surge strength when dry and 42 kilovolts surge strength after being exposed for one week at 100° F. to an atmosphere at 100% humidity. The thickness of the resin was less than 100 mils at the thinnest portions. The 60 cycle wet strength of the molded coil was 13 kilovolts, the dry strength being 28.5 kilovolts.

In each of the following examples the constituents were reacted to polyesters in accordance with Example I and each when admixed with a filler as in Example II produced a highly satisfactory molding composition.

EXAMPLE V

|   | Mols |
| --- | --- |
| Adipic acid | 11 |
| Fumaric acid | 1 |
| Propylene glycol | 3.15 |
| Ethylene glycol | 9.45 |
| Glycerol | 0.3 |

EXAMPLE VI

|   |   |
| --- | --- |
| Maleic anhydride | 1 |
| Adipic acid | 12 |
| Propylene glycol | 4.3 |
| Ethylene glycol | 10 |
| Glycerol | 0.2 |

Small amounts of magnesium oxide, calcium oxide and zinc oxide were included in the molding composition of Example II in order to neutralize any benzoic acid or the like that would be generated by the catalyst. Molded members incorporating heavy inserts of brass therein were prepared therefrom. The addition of the oxides results in an improvement in the tarnishing of the brass which would take place in the absence of such oxide additions. The amount of the oxide additions vary from ¼% to 8% by weight of the total composition.

Numerous molded compositions in accordance with the invention were tested for water absorption. After being immersed for one week in water at room temperatures the weight gain varied from 1.5% for an aluminum silicate filler up to 7.5% for a calcium carbonate filler. These values are satisfactory.

The compositions were immersed in oil at temperatures up to 135° C. for over 100 hours. Very slight changes in hardness and weight were found, otherwise the samples were completely unaffected. After drying and exposing to the atmosphere the oil-immersed samples recovered their initial properties with a few days.

Referring to the drawing, there is illustrated a current coil 10 having electrical conductors 12, magnetic pole pieces 14 and a tough thermoset polyester elastomeric molding composition 16 embedding the electrical conductors and magnetic pole pieces.

It will be understood that the above examples are illustrative and not limited.

We claim as our invention:

1. A moldable polyester resin composition which thermosets to a tough and elastic solid comprising an intimate admixture of (A) from 65 to 25 parts by weight of a finely divided inorganic filler at least 70% by weight of which is a non-fibrous solid filler of an average particle size of below 5 microns and (B) from 35 to 75 parts by weight of a polyester resin derived by heating above 150° C. but not exceeding 260° C., (a) one mol of at least one unsaturated acidic compound selected from the group consisting of fumaric acid, maleic acid, maleic anhydride, citraconic anhydride and citraconic acid, (b) from 10 to 15 mols of adipic acid, (c) from 0.5 to 5 mols of propylene glycol, (d) from 14.0 to 9 mols of ethylene glycol and (e) from 0.1 to 0.75 mol of glycerol, the glycols and glycerol providing sufficient hydroxyl groups to exceed by at least 5% but not over 15% the number of carboxyl groups in the adipic acid and the acidic compound, the heating being continued until the polyester resin has an acid number of below 12 and a viscosity of about K in a 50% solution in toluene.

2. The composition of claim 1, wherein up to 10 mol percent of the adipic acid is replaced with an equimolar proportion of a saturated aliphatic dicarboxylic acid.

3. The composition of claim 1 wherein up to 30% of the weight of the finely divided inorganic filler is replaced with a fibrous filler.

4. The composition of claim 1, wherein a peroxide polymerization catalyst is added in an amount equal to from ½% to 5% of the weight of the (B) polyester resin.

5. The composition of claim 1, wherein up to 20 mol percent of the ethylene glycol and the propylene glycol are replaced with an equimolar proportion of higher glycols.

6. A tough, elastomeric molded member comprising the thermoset product of claim 4.

7. A moldable polyester resin composition which thermosets to a tough, elastomeric solid comprising an intimate mixture of (A) from 65 to 25 parts by weight of an inorganic filler at least 70% by weight of which is a non-fibrous solid filler having an average particle fineness of not in excess of 2 microns, (B) from 35 to 75 parts by weight of a polyester resin derived by heating to temperatures of from 150 but not exceeding 260° C. (a) one mol of fumaric acid, (b) 12 mols of adipic acid, (c) 2.0 to 2.5 mols of propylene glycol, (d) from 12.3 to 11.8 mols of ethylene glycol and (e) from 0.25 to 0.35 mol of gylcerol, heating being continued until the polyester resin has an acid number of not exceeding 8, and a 50% solution in toluene has a viscosity of K or higher on the Gardner-Holdt scale, and (C) a peroxide polymerization catalyst in an amount of from ½% to 3% of the weight of the polyester resin.

8. The composition of claim 7 wherein the inorganic filler comprises over 40% by weight of particles of an average size of not in excess of 2 microns and the balance of the filler comprises particles of an average size of up to 5 microns.

9. A current coil comprising an electrical conductor, a magnetic polepiece and a tough thermoset elastomeric molded composition embedding the electrical conductor and magnetic polepiece, the composition comprising the product derived by curing an intimate mixture of (A) from 65 to 25 parts by weight of an inorganic filler at least 70% by weight of which is a non-fibrous solid filler having an average particle fineness of not in excess of 2 microns, (B) from 35 to 75 parts by weight of a polyester resin derived by heating to temperatures of from 150 but not exceeding 260° C. (a) one mol of fumaric acid, (b) 12 mols of adipic acid, (c) 2.0 to 2.5 mols of propylene glycol, (d) from 12.3 to 11.8 mols of ethylene glycol and (e) from 0.25 to 0.35 mol of glycerol, heating being continued until the polyester resin has an acid number of not exceeding 8, and a 50% solution in toluene has a viscosity of K or higher on the Gardner-Holdt scale, and (C) a peroxide polymerization catalyst in an amount of from ½% to 3% of the weight of the polyester resin.

10. A moldable polyester resin composition which thermosets to a tough and elastic solid comprising an intimate admixture of (A) from 65 to 25 parts by weight of a finely divided inorganic solid filler comprising hydrated alumina of an average particle size of below 5 microns and (B) from 35 to 75 parts by weight of a polyester resin derived by heating above 150° C. but not exceeding 260° C., (a) one mol of at least one unsaturated acidic compound selected from the group consisting of fumaric acid, maleic acid, maleic anhydride, citraconic anhydride and citraconic acid, (b) from 10 to 15 mols of adipic acid, (c) from 0.5 to 5 mols of propylene glycol, (d) from 14.0 to 9 mols of ethylene glycol and (e) from 0.1 to 0.75 mol of glycerol, the glycols and glycerol providing sufficient hydroxyl groups to exceed by at least 5% but not over 15% the number of carboxyl groups in the adipic acid and the acidic compound, the heating being continued until the polyester resin has an acid number of below 12 and a viscosity of about K in a 50% solution in toluene.

References Cited in the file of this patent

UNITED STATES PATENTS

| | | |
|---|---|---|
| 1,975,750 | Safford | Oct. 2, 1934 |
| 2,340,109 | D'Alelio | Jan. 25, 1944 |
| 2,577,618 | Jayne et al. | Dec. 4, 1951 |